Patented Jan. 22, 1924.

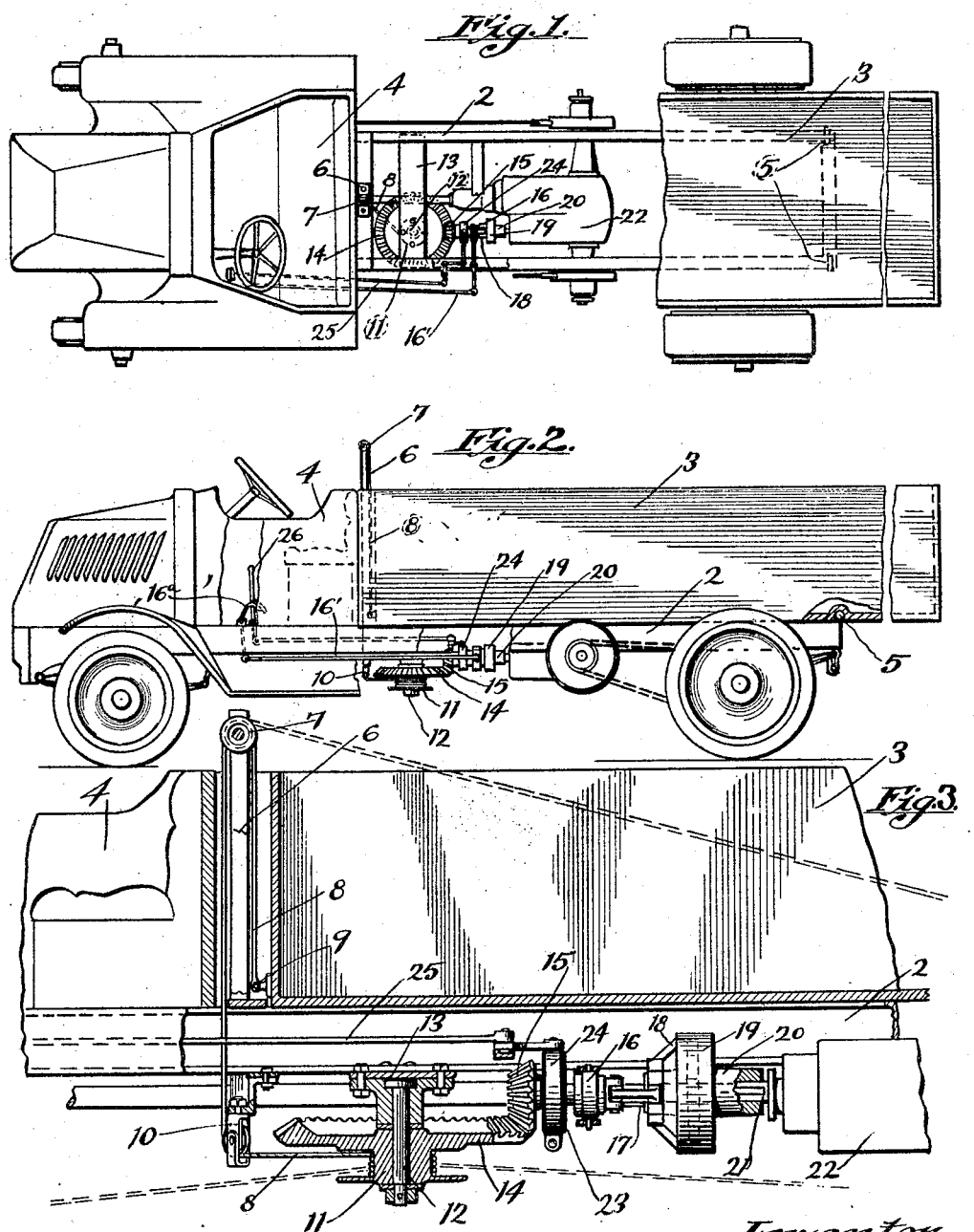

1,481,681

UNITED STATES PATENT OFFICE.

DON C. BRYAN, OF HUNTINGTON BEACH, CALIFORNIA.

MOTOR VEHICLE HOIST.

Application filed May 16, 1922. Serial No. 561,541.

*To all whom it may concern:*

Be it known that I, DON C. BRYAN, a citizen of the United States, residing at Huntington Beach, in the county of Orange and State of California, have invented new and useful Improvements in Motor Vehicle Hoists, of which the following is a specification.

This invention relates to motor vehicle hoists and has for its object to provide a hoist mechanism that can be readily combined with the power transmitting mechanism of a vehicle in such a manner that the power can be utilized to tilt or raise a tilting part of the vehicle.

It is also an object to provide a winch adapted to be readily combined with the power transmitting mechanism of a motor vehicle and by which a rope or cable may be utilized for pulling loads onto the body of the vehicle, or when the remote end of the cable is attached to a fixed object, the vehicle may bodily be shifted backward or forward as may be necessary, as, for instance, when pulling the vehicle out of a hole.

Other objects will be made manifest in the following specification of an embodiment of the invention illustrated in the accompanying drawings, in which:

Fig. 1 is a plan of parts of a motor truck incorporating the invention.

Fig. 2 is a side elevation of a motor truck, parts of which are broken away.

Fig. 3 is an elevation and partial section more in detail.

My present invention is shown as combined with a motor vehicle of the type commonly called a motor truck and having a suitable chassis and frame 2, on the rear end of which there is tiltably mounted a box or body 3, the forward end of which is disposed behind the driver's compartment 4. The body is tiltable on a hinge 5 at the rear end of the frame so that the rear end of the body can be tilted down to the desired degree, as, for instance, contiguous to or on the ground or other surface.

Between the driver's seat and the front end of the body 3 there is arranged an upright stanchion 6, the upper end of which carries a pulley 7. Over the pulley is extended the bight of a cable 8 having one end attached at 9 to the front lower corner of the body 3. The cable 8 passes down from the pulley and is run around a guide pulley 10 disposed in a suitable bearing beneath the frame of the vehicle.

An end of the cable 8 is suitably attached to a drum or reel 11 which may be rotatably mounted on a substantial stud bearing 12 shown as secured on a transversely disposed plate 13 attached to the frame 2.

Formed integrally with, or attached to, one side of the drum 11 is a bevel gear 14 of suitable diameter and which, in the present installation, is shown as arranged on a vertical axis and is in constant engagement with a driving pinion 15 having a driving connection with a clutch shifting collar 16 keyed on a short shaft 17. This shaft carries a driving clutch element 18 designed to be connected to and disconnected from a complementary clutch element 19 having a hub portion 20 adapted to be readily attached to the take off shaft 21, for instance which is now provided in the transmission mechanism indicated at 22.

It is understood that my improved winch structure is adapted to be suitably driven by any appropriate and simple connection with the driving mechanism operated by the motor vehicle engine; the present installation being but illustrative of one form of driving attachment.

When it is desired to raise the tiltable body 3, it is only necessary to shift the clutch sleeve 16 by manipulating a clutch link train including a link 16 and which is connected to a pedal 16ª, and during connection of the clutch members 18 and 19 the drum 11 will be operated and the cable 8 wound thereon and the forward end of the body will be lifted. To control the action of the attachment a brake drum 23 may be associated with the shaft section 17, or any part thereon, this brake drum being engageable by a brake band 24 which can be applied by a link and lever train 25 which may be connected to a brake lever 26.

When the winch is installed on a motor vehicle it is obvious that the cable attached thereto can be utilized for many different purposes, among which may be mentioned the pulling of a vehicle out of the mud hole or other difficult situation, and also the cable can be utilized for shifting objects or for pulling the load onto a vehicle, and it can be used for lending assistance to other vehicles in emergency.

Various modifications and changes may be resorted to within the spirit of the invention as claimed.

What is claimed is:

In combination with a motor vehicle and the transmission gear thereof, a pinion shift and a clutch disposed parallel and to one side of the axis of the vehicle and connectible to the transmission to be driven thereby, a brake on the pinion shift, a pinion on the shaft in front of the brake, a bevel gear mounted on a vertical axis and within the sides of the chassis of the vehicle and engaging the pinion and forwardly of the transmission, said bevel gear having a hub portion forming a winding drum, and a cable leading to and from the drum to be wound on and from the drum, the bevel gear being disposed at the rear of the cab of the vehicle.

In testimony whereof I have signed my name to this specification.

DON C. BRYAN.